(12) United States Patent
Steckl et al.

(10) Patent No.: US 6,821,799 B2
(45) Date of Patent: Nov. 23, 2004

(54) METHOD OF FABRICATING A MULTI-COLOR LIGHT EMISSIVE DISPLAY

(75) Inventors: Andrew Jules Steckl, Cincinnati, OH (US); Yongqiang Wang, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 42 days.

(21) Appl. No.: 10/171,147

(22) Filed: Jun. 13, 2002

(65) Prior Publication Data

US 2003/0230753 A1 Dec. 18, 2003

(51) Int. Cl.⁷ ............................................. H01L 21/00
(52) U.S. Cl. ........................... 438/22; 438/28; 438/115; 438/34
(58) Field of Search ....................... 438/22, 28, 24–29, 438/155, 34, 35; 257/80, 89, 918, 98

(56) References Cited

U.S. PATENT DOCUMENTS

| | | | | |
|---|---|---|---|---|
| 5,710,483 A | * | 1/1998 | Peng | 313/497 |
| 5,952,681 A | | 9/1999 | Chen | 257/89 |
| 5,994,722 A | | 11/1999 | Averbeck et al. | 257/89 |
| 6,100,103 A | | 8/2000 | Shim et al. | 438/26 |
| 6,255,669 B1 | | 7/2001 | Birkhahn et al. | 257/89 |
| 6,319,381 B1 | * | 11/2001 | Nemelka | 204/485 |
| 6,494,758 B1 | * | 12/2002 | Natarajan et al. | 445/37 |

OTHER PUBLICATIONS

J. Heikenfeld, M. Garter, D.S. Lee, R. Birkhahn and A.J. Steckl, *Red Light Emission by Photoluminescence and Electroluminescence from Eu–Doped GaN*, Applied Physics Letters, vol. 75, No. 9, pp. 1189–1191 (Aug. 30, 1999).

D.S. Lee, J. Heikenfeld, R. Birkhahn, M. Garter, B.K. Lee and A.J. Steckl, *Voltage–Controlled Yellow or Orange Emission from GaN Codoped with Er and Eu*, Applied Physics Letters, vol. 76, No. 12, pp. 1525–1527 (Mar. 20, 2000).

A.J. Steckl, J. Heikenfeld, D.S. Lee, M. Garter, *Multiple Color Capability from Rare Earth–Doped Gallium Nitride*, Materials Science and Engineering B81 (2001), pp. 97–101.

D.S. Lee and A.J. Steckl, *Lateral Color Integration on Rare–Earth–Doped GaN Electroluminescent Thin Films*, Applied Physics Letters, vol. 80, No. 11, pp. 1888–1890 (Mar. 18, 2002).

Jason Heikenfeld and Andrew J. Steckl, *Electroluminescent Devices Using a High–Temperature Stable GaN–Based Phosphor and Thick–Film Dielectric Layer*, IEEE Transactions on Electron Devices, vol. 49, No. 4, pp. 557–563 (Apr. 2002).

D.S. Lee et al., *Optimum Er Concentration for In Situ Doped GaN Visible and Infrared Luminescence*, Applied Physics Letters, vol. 79, No. 6, pp. 719–721 (Aug. 6, 2001).

D.S. Lee, J. Heikenfeld, A.J. Steckl, *Growth–Temperature Dependence of Er–Doped GaN Luminescent Thin Films*, Applied Physics Letters, vol. 80, No. 3, pp. 344–346 (Jan. 21, 2002).

(List continued on next page.)

*Primary Examiner*—Carl Whitehead, Jr.
*Assistant Examiner*—Yennhu B. Huynh
(74) *Attorney, Agent, or Firm*—Wood, Herron & Evans, LLP

(57) ABSTRACT

Multi-color light-emissive displays in which the constituent light-emissive devices providing the multiple colors are laterally integrated on the surface of a substrate. The light-emissive devices, typically emitting light by electroluminescence, are arranged such that adjacent devices emit light of a differing wavelength or color. The semiconductor phosphor material forming the active element of each light-emissive device is laterally defined by a lift-off technique in which a patterned layer of a sacrificial material is formed on the substrate, a layer of the semiconductor phosphor material is deposited, and the sacrificial layer is removed to leave semiconductor phosphor material on the substrate in selected locations defined by the pattern. The lift-off technique is iterated to successively fabricate active elements for light-emissive devices of each differing wavelength constituting the multi-color display.

17 Claims, 3 Drawing Sheets

OTHER PUBLICATIONS

D.S. Lee and A.J. Steckl, *Ga Flux Dependence of Er–Doped GaN Luminescent Thin Films*, Applied Physics Letters, vol. 80, No. 5, pp. 728–720 (Feb. 4, 2002).

E. Caleja et al., *Luminescence Properties and Defects in GaN Nanocolumns Grown by Molecular Beam Epitaxy*, Physical Review B (PRB), vol. 62, No. 24, pp. 16826–16834 (Dec. 15, 2000).

A.J. Steckl and R. Birkhahn, *Visible Emission from Er–Doped GaN Grown by Solid Source Molecular Beam Epitaxy*, Applied Physics Letters, vol. 73, No. 12, pp. 1700–1702 (Sep. 21, 1998).

A.J. Steckl, M. Garter, D.S. Lee, J. Heikenfeld and R. Birkhahn, *Blue Emission from Tm–Doped GaN Electroluminescent Devices*, Applied Physics Letyters, vol. 75, No. 15, pp. 2184–2186 (Oct. 11, 1999).

D.S. Lee and A.J. Steckl, *Room–Temperature Grown Rare–Earth–Doped GaN Luminescent Thin Films*, Applied Physics Letters, vol. 79, No. 13, pp. 1962–1964 (Sep. 24, 2001).

A.J. Steckl and J.M. Zavada, *Optoelectronic Properties and Appilcations of Rare–Earth–Doped GaN*, MRS Bulletin, Sep. 1999, pp. 33–38.

R. Birkhahn and A.J. Steckl, *Green Emission from Er–Doped GaN Grown by Molecular Beam Epitaxy on Si Substrates*, Applied Physics Letters, vol. 73, No. 15, pp. 2143–2145 (Oct. 12, 1998).

* cited by examiner

METHOD OF FABRICATING A MULTI-COLOR LIGHT EMISSIVE DISPLAY

FIELD OF THE INVENTION

The invention relates to multi-color displays and, in particular, to multi-color displays based upon light-emissive devices incorporating semiconductor phosphor materials.

BACKGROUND OF THE INVENTION

Flat panel displays offer various advantages over conventional displays, such as a greatly reduced physical profile, lower power and voltage requirements, a reduced heat output, and lighter weight. Flat panel displays consist of an array of light-emissive devices integrated on a single substrate. To form an image, individual light-emissive devices radiate light when lit and are nominally dark when in an unlit state. Flat panel displays have extensive commercial applications and can be used in any product which requires light emission, from simple panel lights to complex displays in industrial fields including automotive instrumentation, consumer televisions, consumer electronics, consumer lighting, aerospace applications, and military uses. Devices used in such flat panel displays may also be suitable for use as lasers in fiber optic communications.

Flat panel displays capable of full multi-color display, usually consisting of three displayed colors such as red, green, and blue, are structurally challenging to fabricate on a single substrate. There are two types of integration models for fabricating light-emissive devices to form multi-color flat panel displays: vertical integration in which the various phosphor films for the light-emissive devices are layered vertically to form a stack, and lateral integration in which the devices are arranged side by side. Vertically-integrated devices are more compact and have a smaller footprint on the substrate surface than laterally-integrated devices. However, the electrical interconnection and operation of vertically-integrated light-emissive devices presents serious practical difficulties. In laterally integrated structures, each phosphor film can be grown at optimized conditions for the emission of each color. By changing the emission intensity from individual light-emissive devices, a multi-color flat panel display may be realized without the electrical interconnect problems of vertically integrated light-emissive devices.

Among the most promising phosphor materials for achieving a multi-color color display is gallium nitride doped with various rare-earth impurities. Gallium nitride thin films are not very robust chemically and, therefore, wet etching with chemical solutions cannot be used to form interleaved arrays of light-emissive devices. Although it is possible to use plasma-based techniques to dry etch rare-earth doped gallium nitride thin films to form active elements for various different colors, the etched surfaces are roughened by the etching process. As a result, it is difficult to grow high quality rare-earth doped gallium nitride thin films for the light-emissive devices emitting the other two colors once the rare-earth doped gallium nitride thin film for the light-emissive devices emitting the first color is formed. Therefore, despite the promise of rare-earth doped gallium nitride as a phosphor material, multi-color displays based on such phosphor materials have yet to be successfully fabricated.

Therefore, there is a need for a multi-color flat panel display having laterally-integrated light-emissive devices capable of emitting light of at least three different wavelengths or colors, and a method of fabricating such multi-color flat panel displays.

SUMMARY OF THE INVENTION

The invention is related to the lateral integration on a single substrate of light-emissive devices emitting light, typically by electroluminescence, with at least two different wavelengths and, in most applications, emitting light with three different wavelengths, such as the three primary colors (red, green and blue) of the visible portion of the electromagnetic spectrum, at an intensity sufficient to be observed visually under various conditions, including daylight ambient lighting. The invention is premised upon a lift-off technique that relies upon a sacrificial layer of a material such as spin-on-glass. According to the invention, a multi-color flat panel display is provided that includes a substrate, a plurality of transparent electrodes, and a plurality of first, second and third light-emissive active elements each disposed between said substrate and a corresponding one of said transparent electrodes. The first, second and third light-emissive active elements are arranged such that each of said first light-emissive active elements is laterally adjacent on said substrate to one of said second light-emissive active elements and one of said third light-emissive active elements. The first, second and third light-emissive active elements emit light of at least one differing wavelength resulting in different colors from within the visible portion of the electromagnetic spectrum.

According to the invention, a method is provided for fabricating a multi-color flat panel display that includes forming a first sacrificial layer on a substrate, providing a plurality of first openings in the first sacrificial layer to the substrate, depositing a first semiconductor phosphor material on the substrate to cover the first sacrificial layer and the substrate through the plurality of first openings, and removing the first sacrificial layer and the first semiconductor phosphor material covering the first sacrificial layer to leave a plurality of first active elements of the first semiconductor phosphor material on the substrate at positions corresponding to the plurality of first openings. The method further includes forming a second sacrificial layer on the substrate and the plurality of first active elements, providing a plurality of second openings in the second sacrificial layer to the substrate in which each of the plurality of second openings is adjacent to a corresponding one of the plurality of first active elements, depositing a second semiconductor phosphor material on the substrate to cover the second sacrificial layer and the substrate through the plurality of second openings, and removing the second sacrificial layer and the second semiconductor phosphor material covering the second sacrificial layer to leave a plurality of second active elements of the second semiconductor phosphor material on the substrate at positions corresponding to the plurality of second openings. Transparent electrodes are then deposited on the plurality of first active elements and the plurality of second active elements to complete the fabrication of the light-emissive devices forming the multi-color flat panel display.

In an alternative embodiment of the method of the invention, the method of fabricating the multi-color flat panel display may further include forming a third sacrificial layer on the substrate, the plurality of first active elements, and the plurality of second active elements, providing a plurality of third openings in the third sacrificial layer to the substrate in which each of the plurality of third openings is adjacent to corresponding ones of the plurality of first active elements and the plurality of second active elements, depositing a third semiconductor phosphor material on the substrate to cover the third sacrificial layer and the substrate through the plurality of third openings, removing the third sacrificial layer and the third semiconductor phosphor material covering the third sacrificial layer to leave a plurality of third active elements of the third semiconductor phosphor material on the substrate at positions corresponding to the plurality of third openings, and depositing transparent electrodes on the plurality of third active elements.

The objects and advantages of the invention will be further appreciated in light of the following detailed description and drawings in which:

DETAILED DESCRIPTION

Although the invention will be described next in connection with certain embodiments, the invention is not limited to practice in any one specific type of light-emissive display. It is contemplated that the invention can be used with a variety of light-emissive displays, including but not limited to commercial products ranging from simple panel lights to complex displays in industry fields, such as automotive instrumentation, consumer televisions, electronics and lighting, aerospace, military, industrial, and lasers and fiber optic communications. The description of the invention is intended to cover all alternatives, modifications, and equivalent arrangements as may be included within the spirit and scope of the invention as defined by the appended claims.

With reference to FIGS. 1A–1H, a fabrication procedure for fabricating light-emissive devices for a multi-color light-emissive display employing the principles of the invention is presented. Typically, the light-emissive devices of the invention are electroluminescent devices that convert electrical energy into light having at least one wavelength within the visible light region of the electromagnetic spectrum, generally accepted to range from approximately 700 nm to approximately 400 nm, that is perceivable by human vision. Typically, the light is characterized by a peak emission wavelength and a full-width-at-half-maximum.

Figure 1A:
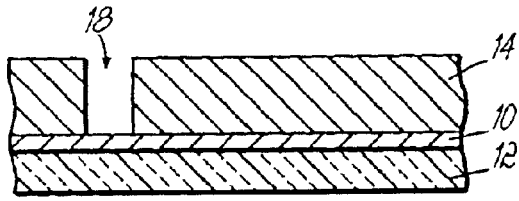
FIGS. 1A–1H are diagrammatic views illustrating a method of fabricating a multi-color electroluminescent display of the invention.

With specific reference to FIG. 1A, the fabrication procedure begins by forming a sacrificial layer 10 on an exposed surface of a substrate 12. Generally, the sacrificial layer 10 should have a thickness ranging between about 0.1 $\mu$m to about 1.0 $\mu$m. The sacrificial layer 10 may be any material capable of withstanding temperatures exceeding about 600° C. without releasing significant quantities of organic and/or inorganic gases and capable of wet etching selectively in a dissolving liquid, such as HCl or HF. The minimization or absence of gas release is important to avoid contaminating vacuum chambers commonly used in semiconductor processing. Candidate materials suitable for the sacrificial layer 10 include, but are not limited to, silicon dioxide, silicon nitride, aluminum, and high temperature photoresist. The sacrificial layer 10 may be applied by conventional techniques such as sol-gel application, spin-on application, dip-on deposition, vapor deposition, and the like. The sacrificial layer 10 may be patterned by conventional methods such as photolithography, stencil mask deposition, ion beam lithography, and the like.

In one specific embodiment of the invention, the sacrificial layer 10 is formed from a spin-on-glass layer. Spin-on-glasses are commercially available liquid solutions containing siloxane or silicate-based monomers diluted in various kinds of solvents or alcohols. The techniques for coating, patterning and wet-etching spin-on glass are familiar to persons of ordinary skill in the art. On coating and curing of spin-on glasses, the monomers are polymerized by condensation and release of water, solvent, and alcohol. The condensed material is a thin solid film having mechanical, chemical and electrical properties which depend on the starting solution, and on the coating and curing process.

To apply the spin-on-glass to the substrate 12, a volume of, for example, about 2 ml to about 4 ml is delivered in a solution form near the midpoint or center of the substrate 12. The substrate 12 is spun at a relatively low angular velocity, for example, between about 50 rpm to about 200 rpm, and for a duration, such as about 1 second to about 10 seconds, operative to spread the spin-on-glass. The substrate 12 is then spun at relatively high angular velocity, for example, about 3000 rpm to about 5000 rpm, and for a duration, such as about 15 seconds to about 60 seconds, operative to coat substrate 12 with a uniform layer of spin-on-glass. The spin-on-glass layer is then cured by baking the substrate 12 in a suitable atmosphere, such as air, for a first cycle at a temperature sufficient and for a duration sufficient to remove any residual water, solvent, and alcohol, and then baking for a second cycle at a higher temperature to harden and densify the spin-on-glass layer to create the sacrificial layer 10. For example, a typical curing process includes a 40 second bake at about 90° C. followed by a 40 second bake at about 120° C. The spin-on application procedure may be repeated as necessary to form a sacrificial layer 10 having a thickness suitable to achieve lift-off. For example, the sacrificial layer 10 of spin-on-glass should have a thickness ranging between about 0.5 $\mu$m to about 0.6 $\mu$m, which typically requires at least two individual spin-on application procedures. As a specific example, the 203AS spin-on-glass available commercially from Honeywell Electronic Materials (Sunnyvale, Calif.) is primarily silica, contains few or no organic compounds, can be annealed up to 900° C., and dissolves completely in a 49.0 vol. % HF solution with a few seconds of exposure time.

The substrate 12 may be any suitable substrate material having a smooth, relatively flat surface finish and a relatively low defect density as understood by persons of ordinary skill in the art. Suitable substrates include, but are not limited to, gallium nitride, silicon, silicon carbide, glass, quartz, sapphire, alumina, titania, and other ceramics apparent to persons of ordinary skill in the art.

With continued reference to FIG. 1A, the sacrificial layer 10 is coated with a photosensitive composition or a photoresist to form a resist layer 14. The resist layer 14 is exposed to light through a mask (not shown) having opaque and clear features and developed to form a resist pattern on the substrate 12. The features of the mask provide a spaced matrix or array of openings, of which a single opening 18 is shown in FIG. 1A, in the resist layer 14. The photoresist of resist layer 14 is a positive photoresist in that the exposed areas are soluble when developed in an appropriate etchant.

Figure 1E:
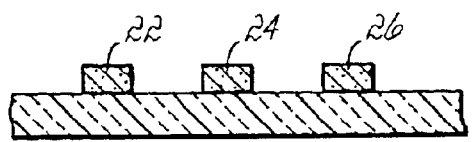
Figure 1B:
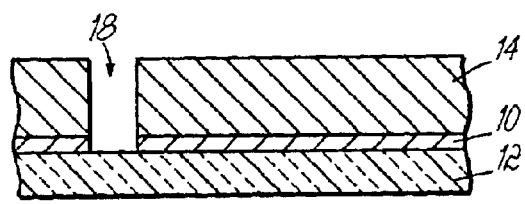

With reference to FIG. 1B, the sacrificial layer 10 is wet etched using an etchant to selectively remove portions of the sacrificial layer 10 in the openings 18 not covered by the photoresist layer 14. For example, if the material forming the sacrificial layer 10 is a spin-on-glass, a commonly-used etchant is a dilute, for example about 0.1 vol. %, solution of HF acid. In those openings 18 from which the sacrificial layer 10 is removed, corresponding areas of the substrate 12 are exposed.

Figure 1F:
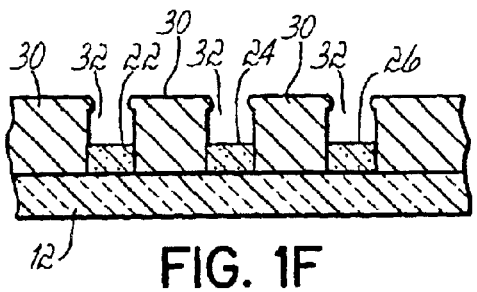
Figure 1C:
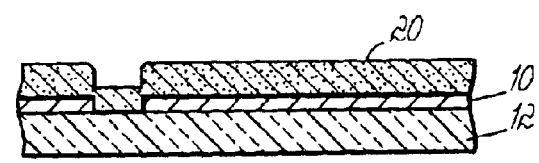

With reference to FIG. 1C, a semiconductor phosphor layer 20 is deposited on the substrate 12. The semiconductor phosphor layer 20 coats the exposed surface of the sacrificial layer 10 and the surface of the substrate 12 through the openings 18 from which the sacrificial layer 10 is absent. The semiconductor phosphor layer 20 may be any wide band-gap semiconductor material doped with a dopant suitable for providing one of the various color light outputs required to fabricate a multi-color display. The wide band-gap semiconductor may be any semi-insulating material that can generate a large enough electric field strength to experience breakdown to generate hot carriers. The dopant may be any element selected from the Periodic Table that is color-emitting, such as Transition metals and Lanthanide metals. Suitable wide band-gap semiconductor materials include III–V compounds such as gallium nitride, aluminum nitride, and gallium phosphide, II–VI compounds such as cadmium sulfide, zinc oxide, zinc telluride, zinc sulfide and zinc selenide, strontium sulfide, calcium sulfide, and IV—IV compounds such as silicon carbide. Typical wide band-gap semiconductor materials include gallium nitride (GaN), aluminum nitride (AlN), and alloys of GaN, AlN and indium nitride (InN), which may be doped with a variety of rare-earth dopants, such as rare-earth elements selected from among the Lanthanides Series of the Periodic Table including, but not limited to, erbium (Er), europium (Eu), thulium (Tm), praseodymium (Pr), and terbium (Tb), and from among the Transition Metal Series of the Periodic Table including but not limited to chromium (Cr) and manganese (Mn).

Any deposition technique capable of forming a thin film of a semiconductor material can be used to apply the semiconductor phosphor layer 20. Suitable deposition techniques include, but are not limited to, molecular beam epitaxy (MBE), metalorganic chemical vapor deposition (MOCVD), organometauic vapor phase epitaxy (OMVPE), hydride vapor phase epitaxy (HVPE), chemical vapor deposition (CVD), plasma enhanced chemical vapor deposition (PECVD), physical vapor deposition by sputtering and evaporation, and laser ablation deposition. Thick film formation techniques, such as screen printing, spin-on deposition, and dip-coating techniques, may also be utilized.

In a specific embodiment of the invention, the semiconductor phosphor layer 20 is formed of gallium nitride doped with a concentration of a rare-earth dopant (RE-doped GaN) suitable to provide the desired wavelength(s) of light output. Each semiconductor phosphor layer 20 is deposited by MBE techniques as understood by persons of ordinary skill in the art. Effusion cells are employed to supply molecular fluxes of gallium (7N purity) and the rare-earth element (3N).

A radio frequency plasma source is used to generate nitrogen radicals to combine with the molecular fluxes of gallium and rare-earth element on the substrate, heated to a suitable deposition temperature, to form the semiconductor phosphor layer 20. The radio frequency (RF) plasma source is provided with a flow of a nitrogen-containing process gas, typically $N_2$, at a flow rate between about 1.2 standard cubic centimeters per minute (sccm) to about 1.8 sccm, typically about 1.5 sccm. An RF power supply electrically coupled with the RF plasma source radio provides RF power during operation of the MBE system at between about 300 W to about 500 W, typically about 400 W, and at a typical frequency of about 13.56 MHz. Typically, a buffer layer of gallium nitride is deposited for about 1 minute to about 5 minutes, the rare-earth doped gallium nitride is deposited for about 30 minutes to about 60 minutes, and a gallium nitride cap layer is deposited for about 1 minute to about 5 minutes. The total film thickness is typically between about 0.5 μm to about 1 μm, with the rare-earth doped gallium nitride having a thickness between about 0.4 μm to about 0.8 μm.

The rare-earth doped gallium nitride is doped with an impurity concentration of Eu suitable to provide devices having light output with a wavelength in the red portion of the electromagnetic spectrum, with an impurity concentration of Er suitable to provide devices having light output in the green portion of the electromagnetic spectrum, or with an impurity concentration of Tm suitable to provide devices having blue output in the blue portion of the electromagnetic spectrum. As examples, a typical impurity concentration for any of Eu, Er, and Tm in GaN ranges from about $10^{18}$ cm$^{-3}$ to about $10^{21}$ cm$^{-3}$. The substrate temperature and the cell temperature of the gallium effusion cell depend upon the identity of the rare-earth dopant. For example, for the rare-earth dopant Er, a suitable substrate temperature is between 500° C. to 700° C., typically about 600° C., a suitable gallium cell temperature is between about 900° C. to about 950° C., typically about 930° C., and a suitable Er cell temperature is in a range of about 840° C. to about 880° C., typically about 860° C. As another example, for the rare-earth dopant Eu, a suitable substrate temperature is between 400° C. to 600° C., typically about 500° C., a suitable gallium cell temperature is between about 900° C. to about 950° C., typically about 920° C., and a suitable Eu cell temperature is in a range of about 380° C. to 420° C., typically about 400° C. As yet another example, for the rare-earth dopant Tm, a suitable substrate temperature is between 400° C. to 600° C., typically about 500° C., a suitable gallium cell temperature is between about 890° C. to about 940° C., typically about 915° C., and a suitable Tm cell temperature is in a range of about 580° C. to 620° C., typically about 600° C.

Figure 1G:
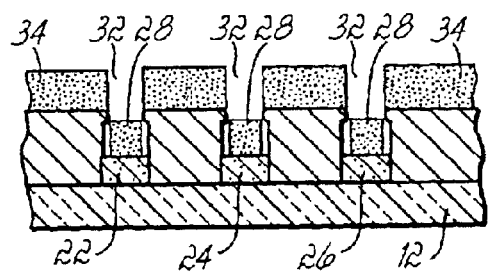
Figure 1D:

With reference to FIG. 1D and assuming that the semiconductor phosphor layer 20 is doped with an impurity suitable to provide light output of a first wavelength or color, such as the primary color red, the sacrificial layer 10 is removed by wet chemical etching with the appropriate dissolving liquid. Portions of the semiconductor phosphor layer 20 coating the sacrificial layer 10 are removed or lifted-off as the sacrificial layer 10 is dissolved. Portions of the semiconductor phosphor layer 20 present on the surface of the substrate 12 in the openings 18 remain as red active elements 22 after the wet chemical etch.

With reference to FIG. 1E, the sequence of steps of FIGS. 1A–1D is repeated a second time using a semiconductor phosphor layer 20 suitably doped to provide active elements 24 for outputting light of a second wavelength or color, such as the primary color green, and a third time using a semiconductor phosphor layer 20 suitably doped to provide active elements 26 for outputting light of a third wavelength or color, such as the primary color blue. In each case, the lift-off technique of the invention using the sacrificial layer 10 is utilized to fabricate the active elements 24, 26. Active element 22 is not significantly altered by the fabrication of active elements 24, 26 and, similarly, active element 24 is not significantly altered by the fabrication of active element 26. The active elements 22, 24, 26 are spatially interleaved such that each active element 22 is adjacent to one of the active element 24 and one of the active element 26 in an arrangement suitable to operate as a multi-color light-emissive display. The lift-off technique relying on sacrificial layer 10 provides sharp and well-defined outer peripheral edges for each active element 22, 24, 26. It is appreciated that, generally, the fabrication procedure of the invention may be used to create a multi-color light-emissive display having more than one type of active element, such as two or three different types of active elements.

Figure 1H:
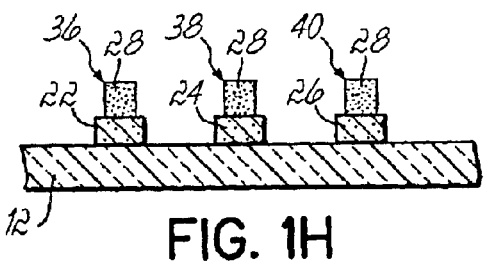

With reference to FIGS. 1F–1H, a transparent electrode 28 is formed on the exposed surface of each of the active elements 22, 24, 26. To that end, a photoresist layer 30 is formed on the substrate 12, as illustrated in FIG. 1F. The photoresist layer 30 is exposed and developed to provide a pattern including a plurality of openings 32 each registered with a corresponding one of the active elements 22, 24, 26. Then and with reference to FIG. 1G, a layer 34 of an electrode material suitable to form the transparent electrodes 28 is deposited on the substrate 12. The electrode material forming layer 34 should have a high transmittance (e.g., greater than about 85%) over the whole visible light range of the electromagnetic spectrum. One suitable electrode material is indium-tin-oxide, which may be deposited by a sputter physical vapor deposition technique.

The electrode material layer 34 coats the photoresist layer 30 and the substrate 12 in areas corresponding to each of the openings 32. As shown in FIG. 1H, the photoresist layer 30 is removed by immersing in a solvent solution. Portions of the electrode material layer 34 overlying the photoresist layer 30 are removed or lifted off with the photoresist layer 30 to leave a pattern of individual transparent electrodes 28 present on the exposed surface of each of the active elements 22, 24, 26. Finally, the substrate 12 is annealed in a nitrogen atmosphere at about 450° C. for about 2 minutes to promote a good electrical contact between each of the transparent electrodes 28 and the elements 22, 24, 26. The final structure consists of an interleaved array of laterally arranged light-emissive devices 36, 38, 40 suitable for multi-color integration. Respective electrical interconnects (not shown) electrically couple each of the transparent electrodes 28 with a direct current voltage source (not shown) operative to induce light emission from the light-emissive devices 36, 38, 40 when the electrodes 28 are selectively biased or otherwise energized.

Figure 2A:
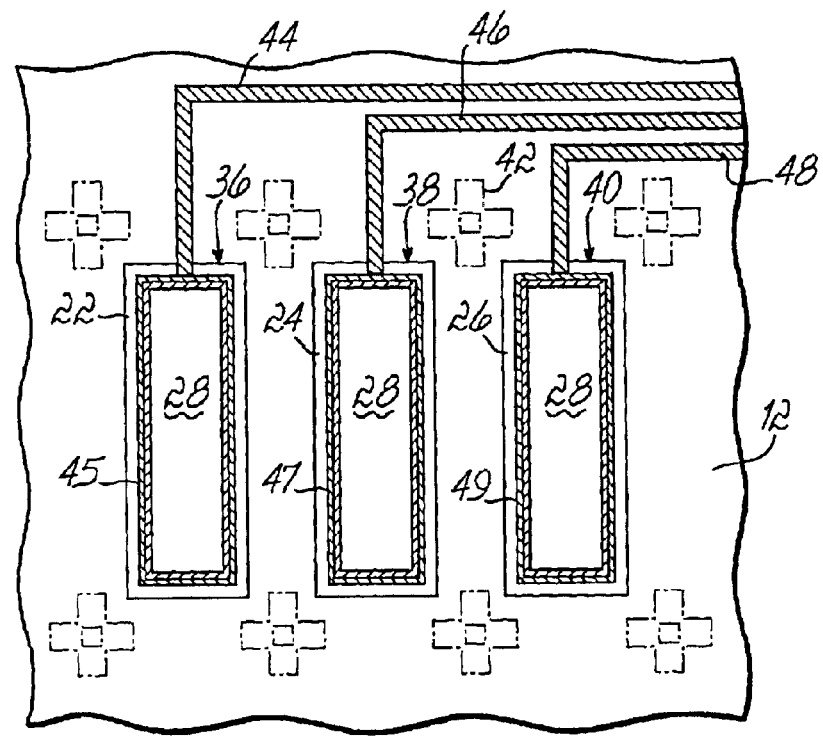
FIG. 2A is a diagrammatic top view of the structure of FIG. 1H.
Figure 2B:
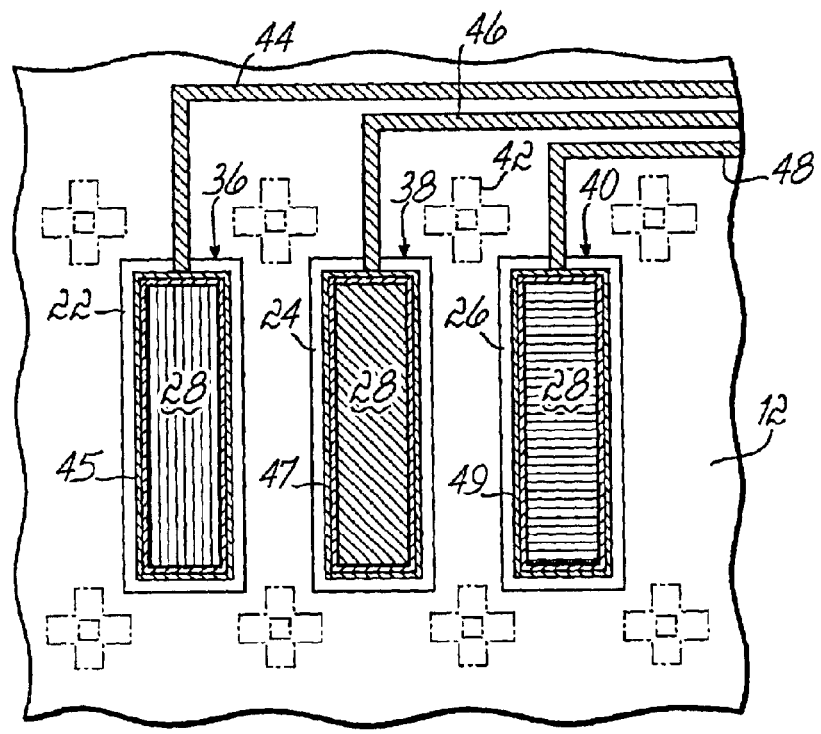
FIG. 2B is a diagrammatic top view of the structure of FIG. 1H shown with the individual light-emissive devices emitting light.

With reference to FIGS. 2A and 2B, three adjacent light-emissive devices 36, 38, 40 from among the multiple devices of the multi-color light-emissive display are shown in which fiducial marks 42 used in the fabrication process are indicated by dot-dashed lines. The transparent electrodes 28, as illustrated in FIGS. 2A and 2B, have lesser dimensions than the respective active elements 22, 24, 26, although the invention is not so limited. Each of the active elements 22, 24, 26 and transparent electrodes 28 are dimensioned and spaced apart as appropriate for the selected multi-color display.

Each of the three light-emissive devices 36, 38, 40 from among the multiple devices of the multi-color light-emissive display is electrically coupled by a respective one of interconnects 44, 46, 48, respectively, with a power supply (not shown). The electrical coupling is accomplished by circuitry (not shown) as understood by persons of ordinary skill in the art for operating a multi-color light-emissive display to display an image by light emission. Interconnect 44 is electrically coupled with a ring electrode 45 having a good electrical contact with the transparent electrode 28 of light-emissive device 36. Similarly, interconnects 46 and 48 are electrically coupled with respective ones of ring electrodes 47 and 49 having a good electrical contact with the transparent electrodes 28 of each of light-emissive devices 38 and 40. The interconnects 44, 46, 48 and the ring electrodes 45, 47, 49 are formed of a material having a relative high electrical conductivity, such as aluminum or gold, and are fabricated by patterned metallization of the surface of the respective transparent electrodes 28 and on an electrically-insulating layer (not shown) first deposited on the surface of the substrate 12. Selective application of a suitable electrical bias, typically a DC bias, to ring electrodes 45, 47, 49 and the corresponding transparent electrodes 28 produces light emission from the respective light-emissive devices 36, 38, 40, as diagramatically indicated in FIG. 2B, with an intensity proportional to the magnitude of the applied power.

It is appreciated by a person of ordinary skill in the art that the description of the active elements 22, 24, 26 as generating individual light outputs to provide the three primary colors red, green and blue, respectively, is exemplary and that multiple different color palettes with three or more colors are contemplated by the invention. It is also appreciated that, as used herein, the color of light output by each of the active elements 22, 24, 26 may be defined as a weighted sum of the three primary colors. It is further appreciated that each active element 22, 24, 26 may contain multiple dopants whose individual light outputs combine in an additive mixture to produce a composite light output. For example, each active element 22, 24, 26 may be formed of gallium nitride doped with Eu, Tm and Er in respective concentrations suitable to provide white light emission by an additive mixture of the three primary colors.

The invention will be further appreciated in light of the following example.

EXAMPLE 1

An array of three light-emissive devices were fabricated on a p-type Si (111) substrate generally following the procedure described above with regard to FIGS. 1A–1H. Spin-on-glass was employed as the material to form the sacrificial layer. Specifically, for each array of active elements, about 3 ml of a spin-on-glass solution (Honeywell 203AS) was delivered near the center of an exposed surface of the Si (111) substrate, which was spun at about 200 rpm for about 2 seconds to spread the solution and then spun at about 3000 rpm for about 30 seconds to uniformly coat the exposed surface of the Si (111) substrate. The spin-on-glass layer was then cured by baking the Si (111) substrate in an air atmosphere at about 90° C. for about 40 seconds to remove residual water, solvent and alcohol, and at about 120° C. for about 40 seconds to harden and densify the spin-on-glass layer. This procedure was repeated to apply a second spin-on-glass layer to provide a total thickness of about 0.6 $\mu$m.

After the spin-on-glass layer was patterned to provide a 0.3 mm wide and 0.8 mm long opening to the exposed surface of the Si (111) substrate, a semiconductor phosphor layer including an individual layer of gallium nitride doped with europium (GaN:Eu) was deposited by MBE. To that end, individual effusion cells in the MBE system were charged with gallium (7N purity) and with the appropriate rare-earth element (3N) to supply the molecular fluxes. The radio frequency plasma source used to generate atomic nitrogen in the MBE system was operated at a plasma power of 400 W and nitrogen process gas was provided a flow rate of about 1.5 sccm. The temperature of Si (111) substrate was about 500° C., the gallium cell temperature was about 920° C., and the Eu cell temperature was about 400° C. The effusion cells and plasma source were controlled to provide the semiconductor phosphor layer formed of a gallium nitride buffer layer deposited for 2 minutes, the rare-earth doped gallium nitride deposited for about 30 minutes, and a gallium nitride cap layer deposited for about 1 minute. The total film thickness of the semiconductor phosphor layer was about 0.5 $\mu$m. The sacrificial spin-on-glass layer and the overlying portions of the semiconductor phosphor layer were removed by etching in a solution of 49.0 vol. % HF to leave a GaN:Eu active element at the location of the opening.

Next, a second sacrificial spin-on-glass layer was applied to the exposed surface of the Si (111) substrate and a second 0.3 mm wide and 0.8 mm opening was formed adjacent to, and 0.2 mm laterally spaced from, the GaN:Eu active element. A semiconductor phosphor layer, including an individual layer of gallium nitride doped with erbium (GaN:Er), was deposited by MBE. With all other deposition conditions equivalent to those for the GaN:Eu semiconductor phosphor layer, the GaN:Er semiconductor phosphor layer was deposited with the Si (111) substrate at a temperature of about 600° C., the gallium cell heated to about 930° C., and the Er cell temperature heated to about 860° C. The sacrificial spin-on-glass layer and the overlying portions of the semiconductor phosphor layer were removed by etching in the 49.0 vol. % HF solution to leave a GaN:Er active element.

Finally, a third sacrificial spin-on-glass layer was applied to the exposed surface of the Si (111) substrate and a third 0.3 mm wide and 0.8 mm long opening was formed adjacent to, and 0.2 mm laterally spaced from, the GaN:Er active element. A semiconductor phosphor layer including an individual layer of gallium nitride doped with thulium (GaN:Tm) was deposited by MBE. With all other deposition conditions equivalent to those for the GaN:Eu and GaN:Er semiconductor phosphor layers, the GaN:Tm semiconductor phosphor layer was deposited with the Si (111) substrate heated to about 500° C., the gallium cell temperature at about 915° C., and the Tm cell temperature at about 600° C. The sacrificial spin-on-glass layer and the overlying portions of the semiconductor phosphor layer were removed by etching in the 49.0 vol. % HF solution to leave a GaN:Tm active element.

Transparent indium-tin-oxide (ITO) electrodes having a thickness of about 0.5 $\mu$m were deposited by sputtering deposition and a photoresist lift-off process on respective exposed surfaces of each of the three rare-earth doped active elements to complete the structures of the light-emissive devices. In this example, each of the active elements is 0.3 mm wide and 0.8 mm long and each of the transparent electrodes was about 0.2 mm wide and about 0.7 mm long with adjacent pairs of active elements spaced laterally from one another by about 0.2 mm.

A DC bias of approximately 30 V was applied to the transparent electrode of each light-emissive device to produce outwardly-directed light emission through the electrode. A DC current of about 35 mA was supplied to the transparent electrode of the red GaN:Eu light-emissive device, about 30 mA to the transparent electrode of the green GaN:Er light-emissive device, and about 50 mA to the transparent electrode of the blue GaN:Tm light-emissive device. An electroluminescence analysis was performed to characterize the light emission from each light-emissive device.

Figure 3:
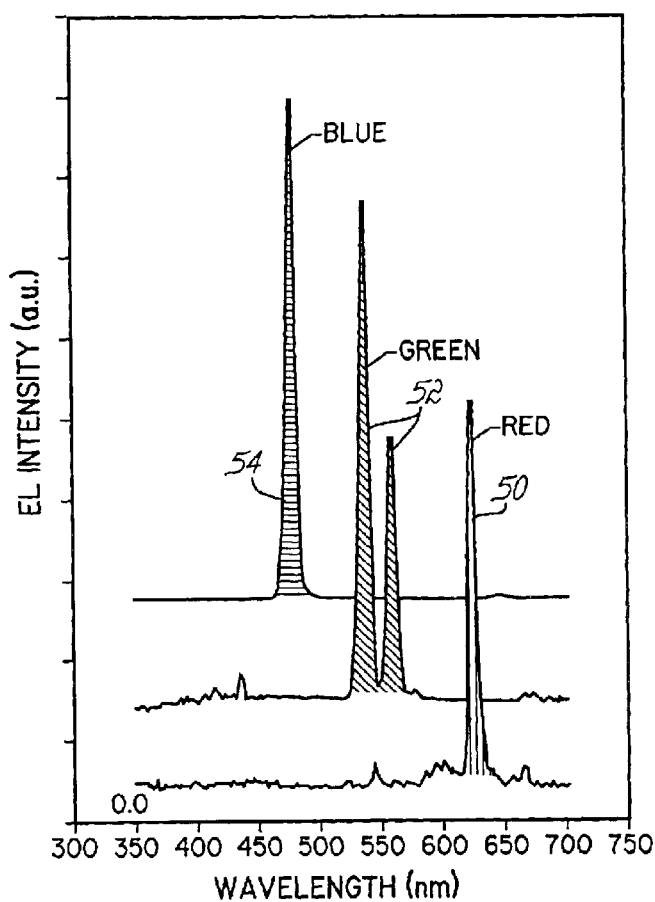
FIG. 3 is a graphical representation of the electroluminescent emission spectrum from the multi-color electroluminescent display of FIG. 2B.

With reference to FIG. 3, electroluminescence spectra are displayed which are representative of the emission from each of the respective light-emissive devices. In curve 50, the dominant red peak emission at 621 nm from the GaN:Eu light-emissive device originates from the dominant $^5D_0$ to $^7F_2$ transitions of the 4f shell of Eu$^{3+}$ ions. In curve 52, the emission spectrum from the GaN:Er light-emissive device consists of two strong and narrow lines at 537 and 558 nm, which provide the green emission color. The two green lines have been identified as Er transitions from the $^2H_{11/2}$ and $^4S_{3/2}$ levels to the $^4I_{15/2}$ ground state. In curve 54, the spectrum of visible emission from the GaN:Tm light-emissive device includes a single blue line at 477 nm. The blue emission at 477 nm is believed to arise from electronic transitions from the $^1G_4$ level to the $^3H_6$ ground state of Tm.

When considered collectively, it is apparent from Curves 50, 54, and 54 that the light output from the light-emissive devices of the invention is suitable for producing a multi-color flat panel display. It is further apparent that the fabrication methods of the invention are capable of fully implementing lateral integration on a single substrate to provide a multi-color light-emissive or flat panel display.

The electroluminescence spectra of Curves 50, 54, and 54 for each of the light-emissive devices has a full-width-at-half-maximum comparable with that of a semiconductor laser. Therefore, the light-emissive devices of the invention also have the potential to be extended to lasers and their related applications, including but not limited to solid state lasers, telecommunication, and optical storage devices, and displays.

Figure 4:
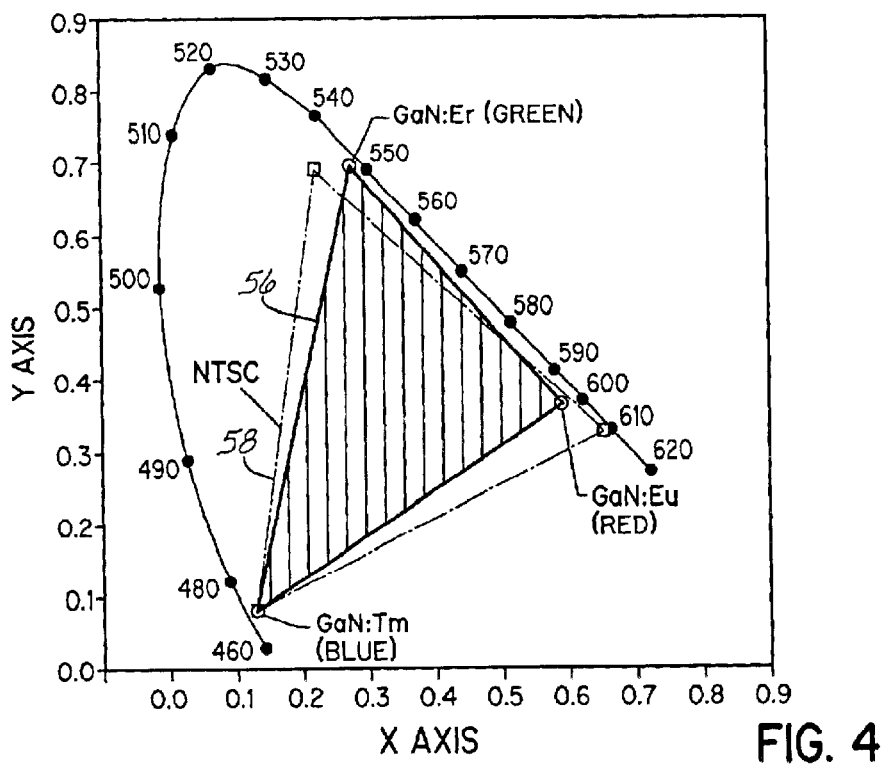
FIG. 4 is a graphical representation of a C.I.E. x-y chromacity diagram showing the coordinates of light emission from the multi-color electroluminescent display of FIG. 2B.

With reference to FIG. 4, a CIE chromaticity diagram illustrates the full color capability of the RE-doped GaN light-emissive devices of the invention and this example. The chromaticity coordinates of the CIE chromaticity diagram numerically represent primary colors in a color sample and meet specifications established by the International Committee on Illumination. The CIE coordinates of the RE-doped GaN light-emissive devices of the invention are plotted on FIG. 4. In curve 56, the blue emission from the GaN:Tm light-emissive device has CIE coordinates of (0.13, 0.09). The CIE coordinates of the green emission from the GaN:Er light-emissive device and the red emission from the GaN:Eu light-emissive device are (0.28, 0.70) and (0.60, 0.37), respectively. The color triangle in FIG. 4 connects and defines the full color capability of emission from GaN doped with Tm (blue), Er (green), and Eu (red). By way of comparison, the CIE coordinates recommended by the National Television System Committee (NTSC) for the three primary colors are shown in FIG. 4 and are interconnected by a color triangle indicated by curve 58 in dot-dashed lines on FIG. 4. It is apparent by comparing curve 56 with curve 58 that the light output from RE-doped GaN phosphors of the invention provides a suitable match in most commercial applications for multi-color displays.

While the invention has been illustrated by the description of various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A method of fabricating a multi-color flat panel display, comprising:
    forming a first sacrificial layer on the substrate;
    providing a plurality of first openings in the first sacrificial layer to the substrate;
    depositing a first semiconductor phosphor material on the substrate to cover the first sacrificial layer and the substrate through the plurality of first openings;
    removing the first sacrificial layer and the first semiconductor phosphor material covering the first sacrificial layer to leave a plurality of first active elements of the first semiconductor phosphor material on the substrate at positions corresponding to the plurality of first openings;
    forming a second sacrificial layer on the substrate and the plurality of first active elements;
    providing a plurality of second openings in the second sacrificial layer to the substrate, each of the plurality of second openings being adjacent to a corresponding one of the plurality of first active elements;
    depositing a second semiconductor phosphor material on the substrate to cover the second sacrificial layer and the substrate through the plurality of second openings;
    removing the second sacrificial layer and the second semiconductor phosphor material covering the second sacrificial layer to leave a plurality of second active elements of the second semiconductor phosphor material on the substrate at positions corresponding to the plurality of second openings; and
    depositing transparent electrodes on the plurality of first active elements and the plurality of second active elements.

2. The method of claim 1 wherein each of the first and second semiconductor phosphor materials is deposited by one of molecular beam epitaxy, metalorganic chemical vapor deposition, organometallic vapor phase epitaxy, hydride vapor phase epitaxy, chemical vapor deposition, plasma enhanced chemical vapor deposition, physical vapor deposition, laser ablation, screen printing, spin-on deposition, and dip-coating techniques.

3. The method of claim 1 wherein the step of removing the first sacrificial layer includes wetting the first sacrificial layer with a liquid effective for dissolving the first sacrificial layer.

4. The method of claim 3 wherein the liquid is a hydrofluoric acid solution.

5. The method of claim 1 wherein the step of removing the second sacrificial layer includes wetting the second sacrificial layer with a liquid effective for dissolving the second sacrificial layer.

6. The method of claim 5 wherein the liquid is a hydrofluoric acid solution.

7. The method of claim 1 wherein the first plurality of active elements are arranged in a first matrix array and the plurality of second active elements are arranged in a second matrix array interleaved with the first matrix array.

8. The method of claim 1 wherein the first and the second sacrificial layers are selected from the group consisting of silicon dioxide, silicon nitride, aluminum, and high temperature photoresist.

9. The method of claim 1 wherein the first and the second sacrificial layers are formed of a spin-on-glass.

10. The method of claim 1 wherein the first and second sacrificial layers are formed by one of sol-gel application, spin-on application, dip-on deposition, and vapor deposition.

11. The method of claim 1 wherein the step of providing the first plurality of openings includes:
    applying a photoresist layer to the first sacrificial layer;
    patterning the photoresist layer by one of photolithography, a stencil mask deposition and ion beam lithography; and
    exposing the patterned photoresist layer to an etchant to form the first plurality of openings.

12. The method of claim 1 wherein the step of providing the second plurality of openings includes:
    applying a photoresist layer to the second sacrificial layer;
    patterning the photoresist layer by one of photolithography, a stencil mask deposition and ion beam lithography; and
    exposing the patterned photoresist layer to an etchant to form the second plurality of openings.

13. The method of claim 1 wherein each of the first and the second semiconductor phosphor materials is capable of emitting light by electroluminescence.

14. The method of claim 1 wherein the first and second sacrificial layers are formed from a material selected from the group consisting of silicon dioxide, silicon nitride, aluminum, and high temperature photoresist.

15. The method of claim 1 wherein the first and second sacrificial layers do not release gases when heated to a temperatures exceeding about 600° C.

16. The method of claim 1 further comprising:
    forming a third sacrificial layer on the substrate, the plurality of first active elements, and the plurality of second active elements;
    providing a plurality of third openings in the third sacrificial layer to the substrate, each of the plurality of third openings being adjacent to corresponding ones of the plurality of first active elements and the plurality of second active elements;
    depositing a third semiconductor phosphor material on the substrate to cover the third sacrificial layer and the substrate through the plurality of third openings;
    removing the third sacrificial layer and the third semiconductor phosphor material covering the third sacrificial layer to leave a plurality of third active elements of the third semiconductor phosphor material on the substrate at positions corresponding to the plurality of third openings; and
    depositing transparent electrodes on the plurality of third active elements.

17. The method of claim 16 wherein the first plurality of active elements are arranged in a first matrix array, the plurality of second active elements are arranged in a second matrix array interleaved with the first matrix array, and the third plurality of active elements are arranged in a third matrix array interleaved with the first and second matrix arrays.

* * * * *

UNITED STATES PATENT AND TRADEMARK OFFICE
CERTIFICATE OF CORRECTION

PATENT NO. : 6,821,799 B2
DATED : November 23, 2004
INVENTOR(S) : Andrew Steckl et al.

It is certified that error appears in the above-identified patent and that said Letters Patent is hereby corrected as shown below:

Title page, Item [54] and Column 1, line 2,
Title, change "LIGHT EMISSIVE" to -- LIGHT-EMISSIVE --.

Title page,
Item [56], References Cited, OTHER PUBLICATIONS, "E. Caleja et al." reference, change "Caleja" to -- Calleja --.
"A.J. Steckl..." reference, change "Letyters" to -- Letters --.
"A.J. Steckl and J.M. Zavada" reference, change "Appilcations" to -- Applications --.

Column 3,
Line 27, change "C.l.E." to -- C.I.E. --.
Line 28, change the word "chromacity" to -- chromaticity --.

Column 5,
Line 31, change the word "suflide" to -- sulfide --.
Line 34, change both occurrences of "AIN" to -- AlN --.
Line 48, change "organometauic" to -- organometallic --.
Line 63, the hard return after "(3N)." should be removed.

Column 8,
Line 42, change "were" to -- was --.

Column 10,
Lines 20 and 26, change first occurrence of "54" to -- 52 --.

UNITED STATES PATENT AND TRADEMARK OFFICE
CERTIFICATE OF CORRECTION

PATENT NO.     : 6,821,799 B2
DATED          : November 23, 2004
INVENTOR(S)    : Andrew Steckl et al.

It is certified that error appears in the above-identified patent and that said Letters Patent is hereby corrected as shown below:

Column 12,
Line 33, change "temperatures" to -- temperature --.

Signed and Sealed this

Sixteenth Day of August, 2005

JON W. DUDAS
*Director of the United States Patent and Trademark Office*